United States Patent
Kawai

[11] Patent Number: 5,937,096
[45] Date of Patent: *Aug. 10, 1999

[54] MOTION IMAGE PROCESSING APPARATUS AND METHOD

[75] Inventor: Tomoaki Kawai, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/563,602

[22] Filed: Nov. 28, 1995

[30] Foreign Application Priority Data

Nov. 30, 1994 [JP] Japan .................................. 6-296673

[51] Int. Cl.⁶ ..................................................... G06K 9/36
[52] U.S. Cl. .............................................................. 382/236
[58] Field of Search ..................................... 382/232, 234, 382/236, 238, 239, 240, 243; 395/474, 508, 512; 348/400, 401, 403, 407, 409, 411, 413, 415, 416, 431; 358/426, 430

[56] References Cited

U.S. PATENT DOCUMENTS

| | | |
|---|---|---|
| 4,910,604 | 3/1990 | Takei et al. .............................. 358/310 |
| 5,212,742 | 5/1993 | Normile et al. ......................... 382/234 |
| 5,253,053 | 10/1993 | Chu et al. ............................... 382/233 |
| 5,267,334 | 11/1993 | Normille et al. ........................ 382/239 |
| 5,379,351 | 1/1995 | Fandrianto et al. ..................... 382/236 |
| 5,461,679 | 10/1995 | Normile et al. ......................... 395/474 |

*Primary Examiner*—Jose L. Couso
*Attorney, Agent, or Firm*—Fitzpatrick, Cella, Harper & Scinto

[57] ABSTRACT

A motion image displaying and storing apparatus includes an image input source for inputting motion image data (such as a camera, or a connection to a network), a storage device (for example, a fast read/write memory) for storing motion image data input by the input source, and a unit for selectively displaying either a motion image that is currently in the process of being stored into the storage device or a motion image read from the storage device. The displaying and storing apparatus can display a motion image that has already been stored in the storage device while the storage device is storing motion image now being input by the image input source.

66 Claims, 6 Drawing Sheets

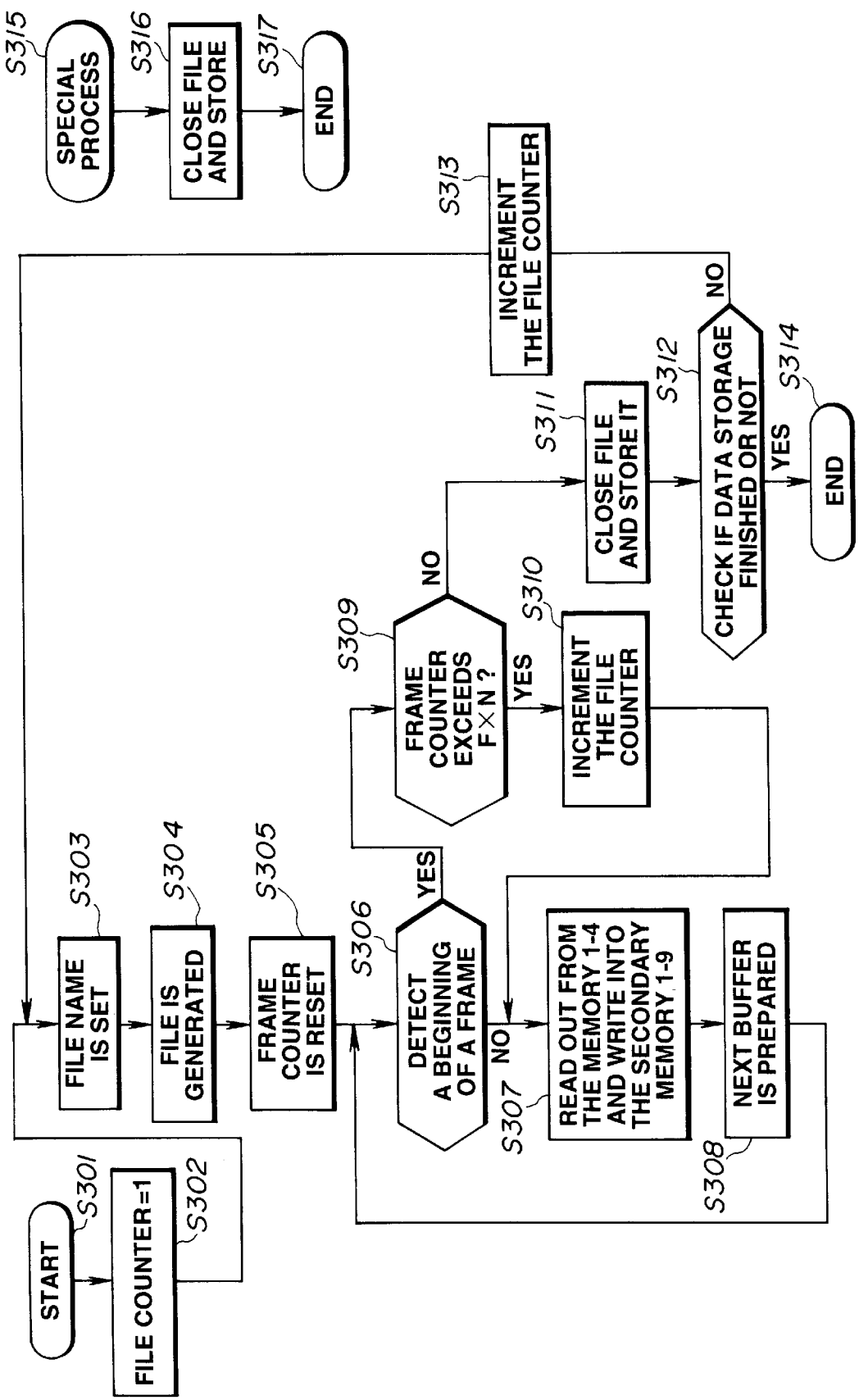

MOTION IMAGE PROCESSING APPARATUS AND METHOD

BACKGROUND OF THE INVENTION

1. Field of the Invention

This invention relates to a motion image processing apparatus and method.

2. Related Art

Files, and even individual frames, of motion image data, e.g., video image data output from a video camera, typically contain a great deal of information. Systems for digitizing motion image data, compressing it based on the MPEG method or the Motion JPEG method and storing it on a storage medium, e.g., a hard disk, are commercially available, as are supervision cameras and television conference systems that transmit image data to remote locations through a network in order to display an image.

In storing motion image data from a video camera into a storage medium, e.g., a hard disk, consecutive image data (by which term is meant image data of plural consecutive frames) is stored as a single file.

Alternatively, image data of each frame is stored as a respective single file.

However, when a body of consecutive image data is stored as a single file, the size of the file is typically huge. Therefore, it is very difficult to handle the file, for example to search for a desired frame in the file, or to edit a desired part of the file.

Generally, while the file apparatus is storing given motion image data, the file apparatus cannot read previously-stored image data unless the apparatus interrupts or terminates the storing operation. Therefore, in order to display a current image which is in the process of being stored in the file apparatus and simultaneously to display an image which has been already stored in the file, it is necessary to provide two display apparatuses, with the associated display driving circuitry and software for them. One of the display apparatuses serves for displaying an image that is being stored currently, while the other is a display for displaying an image that has already been stored. Of course, it is not easy for the operator of such a set of two display apparatuses to use them independent of each other. Furthermore, it is conventionally impossible to browse (synthesize) an image from the image data that was already stored before, into the image that is in the process of being stored currently.

Where each frame is stored as a single file in a file apparatus, on the other hand, the result is too many files for a file apparatus to search or edit. In addition, only some limited number of files can be handled by a file apparatus in the first place.

SUMMARY OF THE INVENTION

An object of the present invention is to provide solutions for the above problems. One particular object of the present invention is to provide a motion image processing apparatus and method that are easy for a user to use.

Another object of the present invention is to provide a motion image processing apparatus and method that are able to display simultaneously an image already stored in a memory and a current image from an image source, for example, a video camera.

Still another object of the present invention is to provide a motion image processing apparatus and method that have a new function not known before.

The foregoing and still other objects, features and advantages of the present invention will become fully apparent from the following description to be taken in conjunction with the attached drawings.

BRIEF DESCRIPTION OF THE DRAWINGS

FIG. 7 is a flow chart for data storage into the memory device FIG. 1.

DETAILED DESCRIPTION OF THE PREFERRED EMBODIMENT

The following is a detailed explanation, which is made with reference to the drawings, of the preferred embodiments of this invention.

Figure 1:
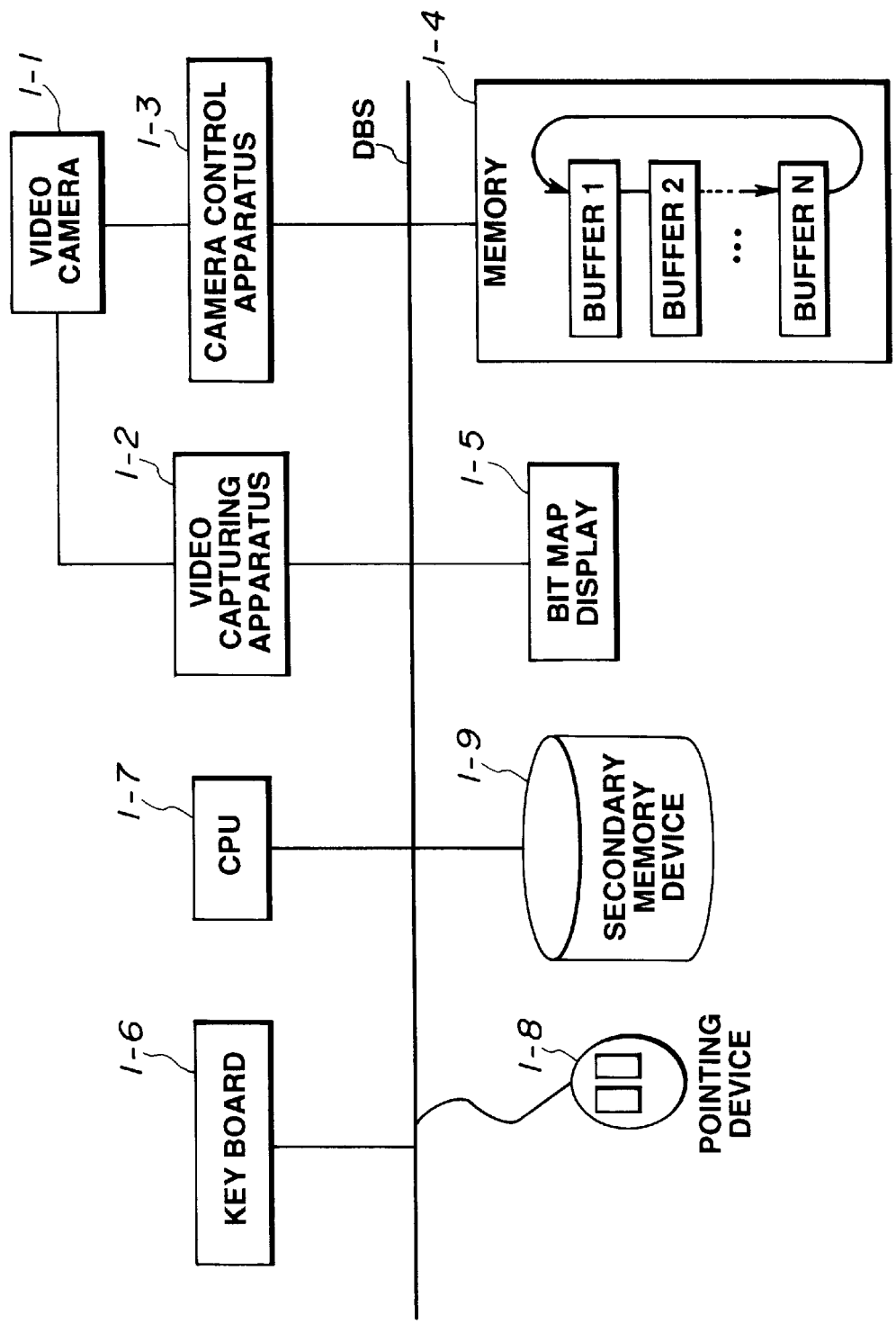
FIG. 1 is a block diagram which shows the overall whole of system of one embodiment of the present invention.

FIG. 1 is a block diagram which shows the overall system of one embodiment of the present invention. In FIG. 1, 1-1 is a video camera, and 1-2 is a video capturing apparatus which performs A/D conversion of video signals captured by the video camera 1-1 and high efficiency coding of digitalized motion image signals, and which sends the compressed data through the data bus system DBS.

1-3 is a camera control apparatus capable of control of functions such as pan, tilt and zoom of the video camera 1-1. 1-4 is a memory that includes plural (N) buffers, 1-5 a bit map display, 1-6 a keyboard, 1-7 a CPU, 1-8 a pointing device (e.g., a mouse), and 1-9 a secondary memory device which is able to write and read data at high speed. The secondary memory device 1-9 includes a frame counter that counts data frame of the device 1-9, and a consecutive counter that counts the umber of files in the device 1-9.

Figure 2:
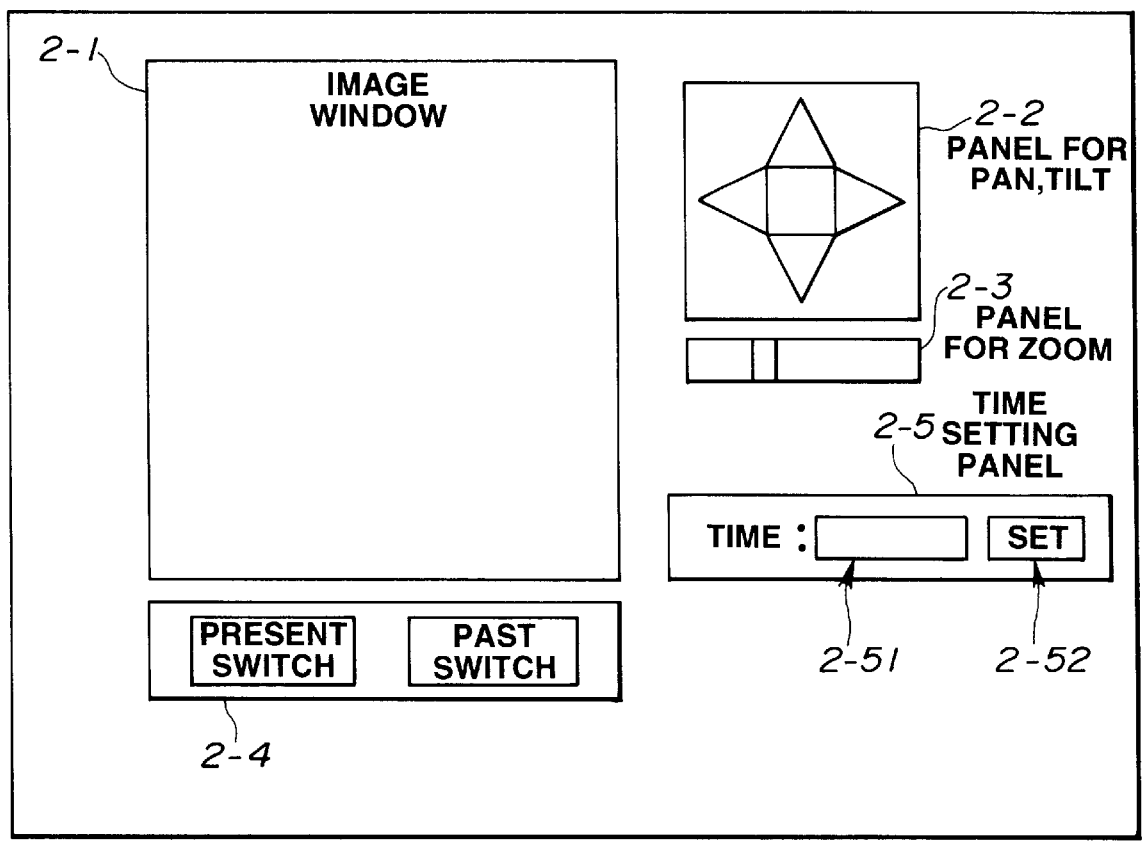
FIG. 2 is an example of the appearance of the bit map display in FIG. 1.
Figure 3:
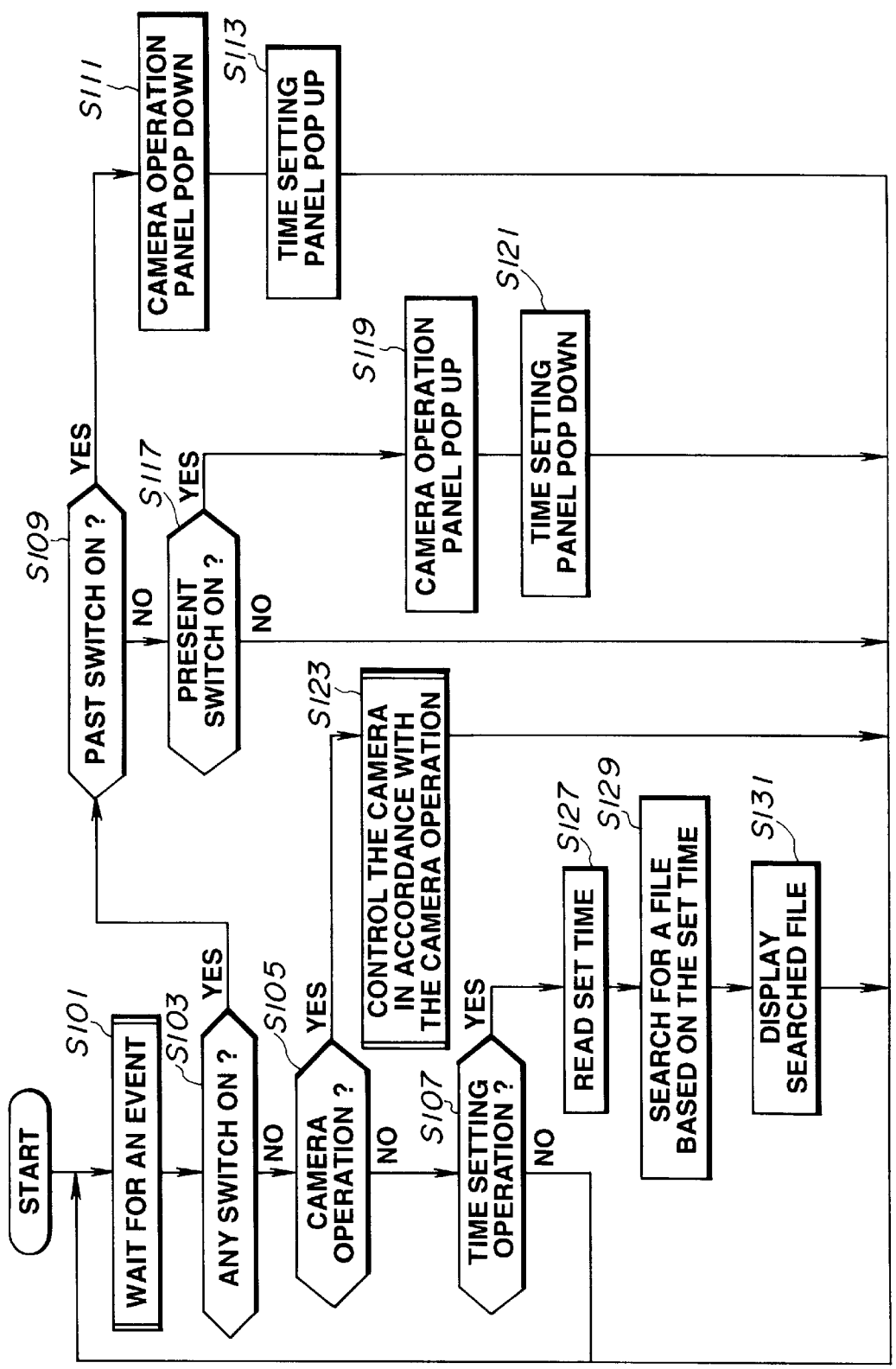
FIG. 3 is a flow chart that shows the operation of the present embodiment.

Following is an explanation of the operation of this embodiment with reference to FIG. 2 and FIG. 3.

In FIG. 2, 2-1 is an image window for displaying motion image data captured by the video camera 1-1, and motion image data stored in the secondary memory device 1-9, read out therefrom and expanded for display (motion image data is normally stored in the secondary memory device 1-9 in compressed form). Camera control panels 2-2 and 2-3 are to be used for control of the camera control apparatus 1-3 shown in FIG. 1. The panels send commands in response to the mouse clicking on a Graphical User Interface ("GUI") shown as elements 2-2 and 2-3, to control the video camera 1-1. For example, panels 2-2 and 2-3 may be used to control camera functions such as pan, tilt and zoom. In the illustrated embodiment, panel 2-2 is for pan and tilt, while panel 2-3 is for zoom.

These commands are laid out in the GUI in the camera control panels 2-2 and 2-3. When the up-and-down button of panel 2-2 is pushed or clicked, the camera angle (elevation) is increased or decreased, and a command for tilt (($\phi$)) as called. When the right-left button is called 2-2 is pushed or clicked, left-right angle $\phi$ (azimuth) is increased or decreased, and a command for pan (φ) is called. Similarly, when the scroll bar 2-3 is operated, zoom magnification is increased or decreased, and a zoom command is called.

Time designation window 2-5 is a panel for inputting the time, in order to access motion image data stored in the secondary memory device 1-9 based on the inputted time, as described below. However, camera control panels 2-2, 2-3 and time designation window 2-5 are not in this embodiment displayed on the screen of the bit map display 1-5 simultaneously.

GUI 2-4 has the function of switching between an image being supplied by the video camera 1-1 in real time and reading out motion image data stored in the secondary memory device 1-9. In a case where the "present" button shown in GUI 2-4 is selected on the screen by the user, an image corresponding to image data being supplied by the video camera 1-1 can be displayed and, at the same time, the time designation window 2-5 is concealed ("pop-down") and the camera control panels 2-2, 2-3 are displayed ("pop-up").

On the other hand, in a case where the "past" button shown in 2-4 is selected on the screen by the user by means of the mouse, motion image data stored in the secondary memory device is read out, expanded (as mentioned above, it is normally stored in compressed form) and displayed on the image window 2-1. At the same time, the camera control panels 2-2, 2-3 are concealed (pop-down), and the time designation window 2-5 is revealed (pop-up). However, at the time of selecting the "past" button, the user has not yet designated the time. By the user inputting the time into the time inputting window 2-51 and clicking the set-up button 2-52, motion image data (if any) corresponding to the time stored in the secondary memory device 1-9 is found therein and is read out. The image data read out from the memory device 1-9 is sent to the display 1-5, and a motion picture corresponding to the designated time is displayed. The desired motion image data stored in the secondary memory device 1-9 is searched for based on the actual time designated in the window 2-51 from a scene corresponding to the designated time and displayed on the image window 2-1.

In this step, for the image data storage operation, a module (not shown in the figures) specialized for storing data is constantly running. This module operates to store image data captured by the video camera 1-1 and the video capture apparatus 1-2 into the secondary memory device 1-9 continuously. In this system, at the same time as an image is being stored into the device, image data can be extracted by a method which will be explained in the following.

Figure 4:
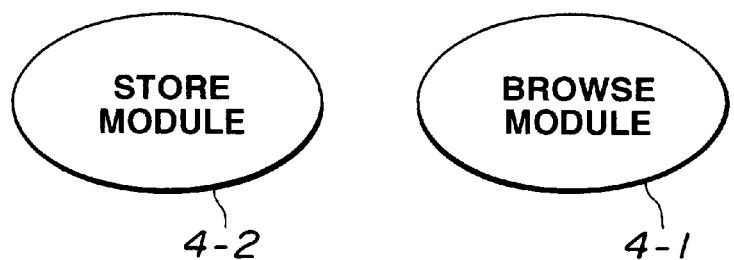
FIG. 4 is a module structure diagram that shows software structure.

FIG. 4 is a module structure diagram that shows software structure. In FIG. 4, 4-1 is a browse module which realizes the features of the GUI shown in FIG. 2 and the operation described with reference to FIG. 3. 4-2 is a storage module which constantly stores image data captured by the video capturing apparatus shown in FIG. 1 into the secondary memory device 1-9, irrespective of the designation of "past" and "present".

FIG. 3 is a flow chart that shows operation of the CPU 1-7 of the present embodiment.

As shown in FIG. 3, the CPU 1-7 awaits an action by the user, for instance, entry of an instruction by a user (S101). The CPU 1-7 discriminates whether the instruction is entered through any of the various kinds of switches on the keyboard 1-6 (S103), whether the action is from the camera (S105), or whether the instruction is provided through operation of a timer or the like (S107). When the CPU 1-7 discriminates that the instruction has been entered through one of the switches on the keyboard 1-6, the CPU 1-7 discriminates whether that one switch is the "past" switch or not (S109).

If the "past" switch is operated, following step S111, for instance, the camera operation panel 2-2 is popped down (concealed), and the time setting panel 2-5 is popped up made to appear. After a negative determination in step S109, the CPU 1-7 discriminates whether the "fpresent" switch is operated or not (S111).

When the "present" switch is operated, the camera operation panel 2-2 is popped up (S119), and the time setting panel 2-5 is popped down.

In step S105, when the CPU-7 discriminates that the instruction is from the camera due to operation, for example, of the "pan" or "tilt" switch or GUI, the CPU 1-7 sends an instruction to the camera control apparatus 1-3, which then controls the camera 1-1 in accordance with the instruction (S123).

In step S107, when the CPU 1- 7 discriminates that the instruction has originated from a time setting operation, the CPU 1-7 reads out time data set on the panel 2-51 by the switch 2-52 (S127), and searches for a file corresponding to the time data in the secondary memory device 1-9. The CPU 1-7 controls the secondary memory device 1-9 and the memory 1-4 so that an image of the searched file is displayed on the bit map display 1-5.

Another embodiment of operation panel will be explained with reference to FIG. 5. The operation panel shown in FIG. 5 makes it easier for the user to select between image data which is now being stared into a storage apparatus and image data which has already been stored.

Figure 5:
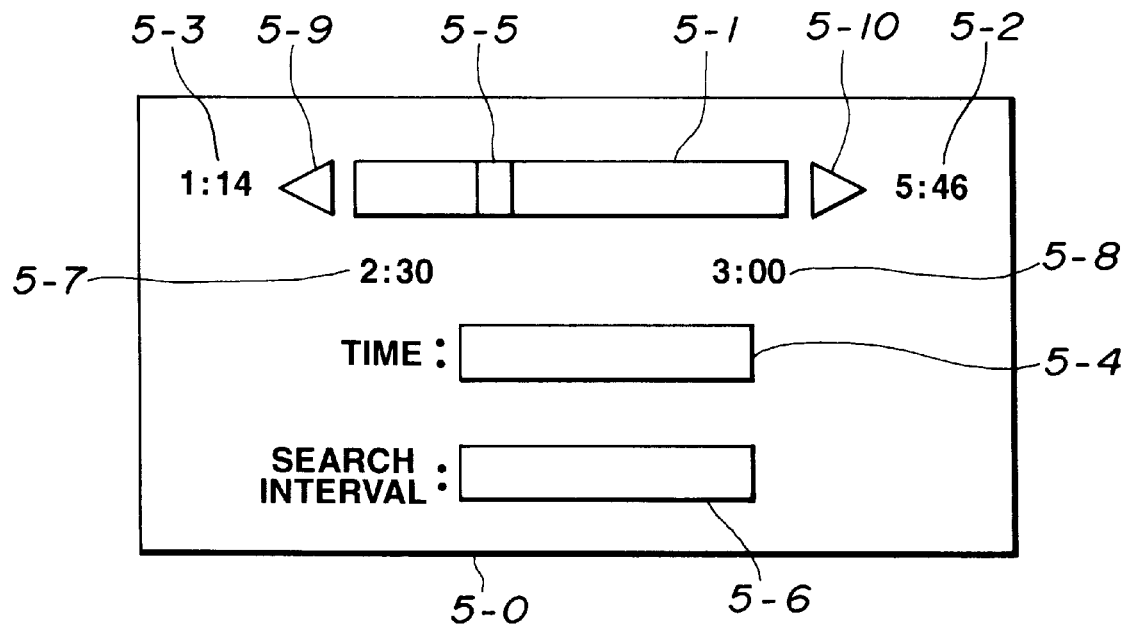
FIG. 5 is another example of appearance of the bit map display in FIG. 1.

The panel shown in FIG. 5 has time set operation panel 5-0 instead of the panel 2-5 shown in FIG. 2. 5-1 is a scroll bar for time scrolling of image data stored in the storage apparatus with a shifting notch 5-5.

At the beginning of operation of the operation panel 5-0, the time is not displayed. After the shifting notch 5-5 is operated by the user, the time display window 5-4 displays the time corresponding to the position of the shifting notch 5-5, and the video window 2-1 displays an image corresponding to that time.

In this embodiment, the length of the scroll bar 5-1 corresponds to thirty minutes. Therefore, by moving the shifting notch 5-5, the user can select a time within a thirty-minute range.

5-3 displays the oldest time of any image data in the selected file, in other words the time when image data storage of that file began. Similarly, 5-2 displays the latest time of any image data in the selected file.

When the apparatus records image data from the video camera 1-1, 5-2 displays the current time. Therefore when the user shifts the notch 5-5 to the right end of the scroll bar 5-1 (that is, the latest time 5-2), image data which is being recorded currently is displayed on the window 2-1, and the camera operation panels 2-2, 2-3 are displayed on the bit map display 1-5.

When the notch 5-5 is not at the right end of the scroll bar 5-1, the time 5-4 display displays the time corresponding to the position of the notch 5-5, and the image data corresponding to that time is displayed on the window 2-1.

5-6 displays the frame skip rate which is available when the user shifts the shifting notch 5-5 for fast forward frame search or fast reverse frame search.

5-7 displays the time corresponding to the left end of the scroll bar 5-1.

5-8 displays the time corresponding to the right end of the scroll bar 5-1.

5-9 and 5-10 are triangular buttons for shifting time extent between the times shown at 5-7 and 5-8. For example, if the user clicks button 5-9 in the display of FIG. 5, 5-7 displays 3:00 and 5-8 displays 3:30.

Thus, using the operation panel 5-0 shown in FIG. 5, it is easier for the user to scroll an image on the window 2-1 from past to current.

Storage operation of the storage device 1-9 will be described, with reference to FIG. 6 and FIG. 7.

Figure 6:
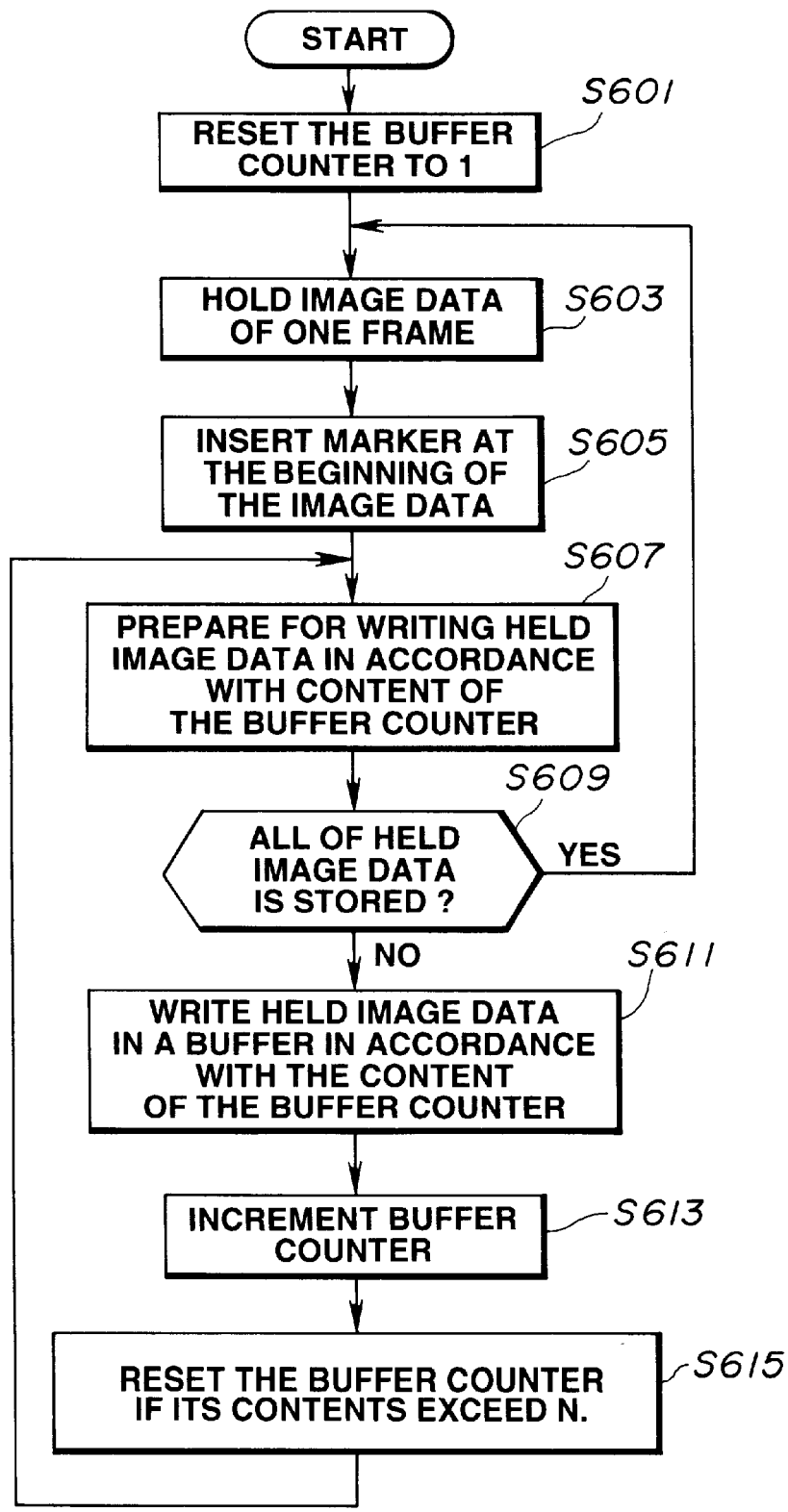
FIG. 6 is a flow chart showing image data storing steps performed by the buffer memory in FIG. 1.

FIG. 6 is a flow chart showing the image data storage procedure. The video capture apparatus 1-2 converts image data from video camera 1-1 into digital image data and compresses it by the MPEG method or the like (this assumes that the data needs to be compressed; if not, the description relating to compressing and expanding can be disregarded, and all statements about compressed data can be understood as relating to uncompressed data. After that, the buffer memory 1-4 stores the compressed image data.

The buffer memory 1-4 includes N sections of buffer (from #1 to #N), arranged as a ring buffer. Image data of one frame is divided into pieces and stored in some of the buffer sections #1 to #N. For example when buffer #c is full while image data is being stored in buffer #i (i being a natural number from 1 to N), any of the image data that does not fit in buffer #i is written into buffer #i+1. After completing ring storage in buffer #N, any following data will be stored into buffer #1.

With reference to FIG. 6, the operation of writing image data into the buffer memory 1-4 will be described.

FIG. 6 is a flow chart showing the steps in storing image data in the memory 1-4 in FIG. 1. The buffer memory 1-4 has a buffer counter for designating one of the buffers. The buffer counter is reset (S601), image data of one frame is held (S603), and a marker is inserted at the beginning of each frame (S605). By means of these markers, it is easy to search out the start point of each frame.

The memory 1-4 prepares for writing the image data held at S603 into one of the buffers in accordance with the contents of the buffer counter (S607). It is detected whether all of the held image data has now been stored or not (S609). If not, S611 is executed: for instance, the memory 1-4 writes held image data in a buffer in accordance with the contents of the buffer counter.

The buffer counter is then incremented (S613). If the counter contents exceed N, the counter is reset (S615).

FIG. 7 is a flow chart explaining data storage into the secondary memory device 1-9. Once flow starts (S301), a file counter is reset to 1 (S302), and the file name is set by the user (S303). For example, the file name may be a combination of user name and a number provided by a counter to distinguish plural files of one user. For example, supposing the user's name is Mr. ABC, the file names are Mr. ABC-1, Mr. ABC-2, Mr. ABC-3. . . .

Thus, a file is generated (S304), and the frame counter is reset (S305). S306 is a step for detecting the beginning of a frame. The data stored in one buffer of the memory 1-4 is read out and is written into the frame of the secondary memory 1-9 (S307). After that the next buffer is prepared to be read out (S308).

The flow returns to S306 after S308, and the beginning of another frame is detected. When the beginning of a frame is detected, the flow divides to step S309, a step for checking whether the contents of the frame counter exceed F×T or not (F=number of frames per sec., and T=time permitted per file).

Following S309, the frame counter is incremented (S310), and the flow returns to S304. At S309, in the case that the contents of the frame counter exceed F×T, the data file is closed and stored (S311). For example, data file Mr. ABC-2 is stored. S312 is a step for checking whether data storage is finished or not; when it is not finished, the file counter is incremented, for example Mr. ABC-2, and flow returns to S303.

S315 is a special process step for interrupting the routine shown from step S301 to step S313, in accordance with a special instruction, for example, "power off", from the user. Following S315, the file is closed and stored (S316), and flow ends (S317).

According to step S302 or S313, motion image data is divided into plural files of equal time duration, and the files are stored in the secondary memory device 1-9. For instance, supposing T=1/F, each file contains one frame of data. The CPU 1-7 makes an index file, for example, as shown in chart 1.

CHART 1

| Storage Start Time | 1994.9.30 14 h 21 m 30 s |
| --- | --- |
| Frame Rate | 5 frames/sec. |
| Storage Time | 60 sec. |
| File name | "va" |

According to chart 1, motion image data is stored from 14:21:30 on Sep. 30, 1995 at a rate of 5 frames per sec. Sixty seconds of motion -image data, that contains 60×5=300 frames, is stored as one file.

The file names are va-0, va-1, va-2, . . . . The file va-0 contains motion image data from 14:21:30 on Sep. 30, 1994 to 14:22=30 on Sep. 30, 1994, the file va-1 contains motion image data from 14:22=30 to 14:23=30 on Sep. 30, 1994, the file va-2 contains motion image data from 14:23=30 to 14:24=30 on Sep. 30, 1994, etc.

In the case that the file name is limited to a certain length, directory names are used instead of file names. For instance, if the length of file name is limited to 6 characters, directory names are "1", "1", "2", to "FFFFFF" instead of "va-0", "1", "va-2". . . .

According to this method, $2^{24}$ files are available (according to the present embodiment, these are files whose time durations are equal to each other; however, files of equal data amount, rather then equal duration, are also available).

To make files of equal data amount, a calculator for calculating the amount of data in each file is provided, instead of the frame counter incremented at step S309.

The present embodiment comprises the video camera 1-1 and the video capturing apparatus 1-2, and stores video data from the video camera 1-1. However, the present invention is useful to store video data as it arrives in real time from a network or digital continuous media and that includes a time component, for example, audio data.

According to the present embodiment, motion image data is divided into files of which the time durations (or the amounts of data, depending on the embodiment) are equal to each other, each file thus being neither huge nor only one frame in size. Therefore, each file is easy to handle. Furthermore, according to the present embodiment, it is easy to change file size in order not to be restricted by buffer memory size or disk size.

The second embodiment that simultaneously displays an image corresponding to image data stored in the secondary memory 1-9 and an image corresponding to current image data being received from the video camera 1-1, will now be described.

In the second embodiment, the secondary memory device 1-9 is fast enough to transmit alternately (1) between the recording memory device 1-9 and the memory 1-4 and (2) between the video capture apparatus 1-2 and the memory 1-4 through the bus.

During transmission of motion image data to the secondary memory device 1-9 from the memory 1-4, other motion image data which the secondary memory device 1-9 has stored before, are transmitted to the memory 1-4, intermittently. To transmit them, the memory 1-4 which includes the N-piece buffer, is divided into two parts, a first N/2-piece buffer and a second N/2-piece buffer. The buffers of the first part are used to transmit image data from the memory 1-4 to the secondary memory device 1-9, while the buffers of the second part are used to transmit image data from the secondary memory device 1-9 to the memory 1-4.

The image data which is transmitted to the memory 1-4 from the secondary memory device 1-9 are stored in the memory 1-4, and are read out to the bit map display 1-5 at a suitable data transmission rate for the display. (The transmission rate is, e.g., 60 frames per sec.) The display 1-5 has a function of decoding (expanding) image data from the secondary memory device 1-9 and displaying that data in the window, 2-1 shown in FIG. 2. The display 1-5 also has a function of decoding image data from the video capture device 1-2 directly and displaying it in the window, instead of the image data from the secondary memory device 1-9.

According to the present embodiment, it is possible to display a motion image corresponding to motion image data that were stored in a memory previously, while other motion image data being received currently are in the process of being stored in the memory. Also, according to the present embodiment, image data is divided into plural parts based on a suitable method and is stored in a memory. As described above, the present invention makes it is easy to search for the desired image data in the memory.

In the present embodiment, motion image data may be compressed based on the JPEG method or the MPEG method. However, the present invention is not limited to the JPEG method or the MPEG method; other compression methods will also be useful.

The individual components shown in outline or designated by blocks in the drawings are all well known in the image processing arts, and their specific construction and operation are not critical to the operation or best mode for carrying out the invention.

While the present invention has been described with respect to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A motion image processing apparatus comprising:
   input means for inputting motion image data;
   storage means for storing motion image data input by said input means; and
   means for selectively displaying a first motion image, corresponding to image data which is currently being stored into said storage means, and a second motion image, corresponding to image data which has been stored in said storage means previously, while the image data corresponding to the first motion image is being stored; and
   manual instruction means for switching between (1) displaying the first motion image and (2) the second motion image on said displaying means.

2. A motion image processing apparatus according to claim 1, wherein said storage means includes a memory so constructed that data can be written thereinto simultaneously with reading out of data therefrom.

3. A motion image processing apparatus according to claim 1, wherein the motion image data is compressed image data.

4. A motion image processing apparatus according to claim 3, wherein the compressed image data is compressed using the MPEG method.

5. A motion image processing apparatus comprising:
   input means for inputting motion image data;
   variable length coding means for coding the motion image data input by said input means; and
   storing means for storing the motion image data coded by said variable length coding means, wherein said storing means stores, as a single file, a predetermined length of time or a predetermined plural number of frames of data coded by said variable length coding means.

6. A motion image processing apparatus according to claim 5, further comprising means for reading out the motion image data stored by said storing means as the single file.

7. A motion image processing apparatus according to claim 5, wherein said variable length coding means codes the motion image data input by said input means, using the MPEG method.

8. A motion image processing apparatus according to claim 5, wherein said variable length coding means codes the motion image data input by said input means, using the JPEG method.

9. A motion image processing apparatus according to claim 5, wherein said input means comprises a video camera.

10. A motion image processing apparatus according to claim 5, further comprising means for designating image data to be read out.

11. A motion image processing apparatus comprising:
    input means for inputting current motion image data;
    storage means for storing input data input by said input means; and
    means for manually designating motion image data stored by said storage means,
    wherein said manually designating means includes a single icon, and wherein actuation of said single icon serves to designate, selectively, (1) data being input by said input means versus (2) data already stored in said storage means.

12. A motion image processing apparatus according to claim 11, further comprising means for displaying said single icon on a monitor.

13. A motion image processing apparatus according to claim 11, wherein said single icon is a bar-shaped icon.

14. A motion image processing apparatus according to claim 11, wherein said storage means comprises hard discs.

15. A motion image processing method comprising the steps of:
    inputting motion image data;

storing, in a storage means, motion image data input in said inputting step; and selectively displaying a first motion image, corresponding to image data which is currently being stored in the storage means, and a second motion image, corresponding to image data which has been stored in the storage means previously, while the image data corresponding to the first motion image is being stored; and manually entering an instruction for switching between (1) displaying the first motion image and (2) displaying the second motion image.

16. A motion image processing method according to claim 15, wherein the storage means includes a memory so arranged that data can be written thereinto simultaneously with reading out of data therefrom.

17. A motion image processing method according to claim 15, wherein the motion image data is compressed image data.

18. A motion image processing method according to claim 17, wherein the compressed image data is compressed using the MPEG method.

19. A motion image processing method comprising the steps of:

inputting motion image data;

variable length coding the motion image data input in said inputting step; and storing, in a storage means, the motion image data coded in said variable length coding step, wherein said storing step includes storing, as a single file, a predetermined length of time or a predetermined plural number of frames of data coded in said variable length coding step.

20. A motion image processing method according to claim 19, further comprising the step of reading out the motion image data stored in said storing step as the single file.

21. A motion image processing method according to claim 19, wherein said variable length coding step includes coding the motion image data input in said inputting step, using the MPEG method.

22. A motion image processing method according to claim 19, wherein said variable length coding step includes coding the motion image data input in said inputting step, using the JPEG method.

23. A motion image processing method according to claim 19, wherein said inputting step is performed using a video camera.

24. A motion image processing method according to claim 19, further comprising the step of designating image data to be read out.

25. A motion image processing method comprising the steps of:

inputting current motion image data;

storing, in a storage means, data input in said inputting step; and manually designating motion image data stored in the storage means, wherein said manually designating step is performed using a single icon, and wherein actuation of the single icon serves to designate, selectively, (1) data being input by said inputting step versus (2) data already stored in the storage means.

26. A motion image processing method according to claim 25, further comprising the step of displaying the single icon on a monitor.

27. A motion image processing method according to claim 26, wherein the single icon is a bar-shaped icon.

28. A motion image processing method according to claim 25, wherein the storage means comprises hard discs.

29. A motion image processing apparatus comprising:

input means for inputting digital motion image data;

storage means for storing digital motion image data input by said input means;

means for selectively displaying a first motion image corresponding to digital image data which is currently being stored into said storage means, and a second motion image, corresponding to digital image data which has been stored in said storage means previously, while the image data corresponding to the first motion image is being stored; and manual instruction means for switching between (1) displaying the first motion image and (2) displaying the second motion image on said displaying means.

30. A motion image processing apparatus according to claim 29, wherein said storage means includes a memory so constructed that data can be written thereinto simultaneously with reading out of data therefrom.

31. A motion image processing apparatus according to claim 29, wherein the motion image data is compressed image data.

32. A motion image processing apparatus according to claim 31, wherein said compressed image data is compressed using the MPEG method.

33. A motion image processing apparatus according to claim 29, wherein said manual instruction means comprises a user interface displayed on said displaying means.

34. A motion image processing apparatus according to claim 29, wherein said input means comprises a video camera.

35. A motion image processing apparatus according to claim 29, wherein said input means comprises a video capture apparatus and a video camera connected to said motion image processing apparatus by said video capture apparatus.

36. A motion image processing apparatus according to claim 29, wherein said input means comprises a video camera, and said manual instruction means can control at least panning, tilt and zoom of said video camera.

37. A motion image processing apparatus according to claim 33, wherein the second motion image is reproduced in response to the instruction to the user interface displayed on said display means at a desired time.

38. A motion image processing apparatus according to claim 33, wherein it is possible to perform fast frame search and fast reverse frame search of the second motion image in response to the instruction to the user interface displayed on said display means.

39. A motion image processing apparatus comprising:

input means for inputting motion image data;

variable length coding means for coding the motion image data input by said input means; and storing means for storing the motion image data coded by said variable length coding means, wherein said storing means stores, as a single file, a predetermined length of time or a predetermined plural number of frames of data coded by said variable length coding means, and said single file has a file name.

40. A motion image processing apparatus according to claim 39, further comprising means for reading out the motion image data stored by said storing means as the single file.

41. A motion image processing apparatus according to claim 39, wherein said variable length coding means codes the motion image data input by said input means, using the MPEG method.

42. A motion image processing apparatus according to claim 39, wherein said variable length coding means codes the motion image data input by said input means, using the JPEG method.

43. A motion image processing apparatus according to claim 39, wherein said input means comprises a video camera.

44. A motion image processing apparatus according to claim 39, wherein reading out of an image to be read out is performed by means of the user interface on a display.

45. A motion image processing apparatus according to claim 41, wherein said variable length coding means codes the motion image data input by said input means, using the JPEG method, and wherein index information corresponding to said single file exists and includes at least one of (1) information relating to the time when said file is stored, and (2) information relating to the time to store said file.

46. A motion image processing apparatus according to claim 45, wherein said first motion image is input through a network.

47. A motion image processing apparatus according to claim 45, wherein said file name is given to said motion image processing apparatus by a user.

48. A motion image processing method comprising the steps of:
inputting digital motion image data;
storing, in a storage means, digital motion image data input in said inputting step;
selectively displaying a first motion image, corresponding to digital image data which is currently being stored into the storage means, and a second motion image, corresponding to digital image data which has been stored in the storage means previously, while the image data corresponding to the first motion image is being stored; and
manually instructing for switching between (1) displaying the first motion image and (2) displaying the second motion image.

49. A motion image processing method according to claim 48, wherein the storage means includes a memory so constructed that data can be written thereinto simultaneously with reading out of data therefrom.

50. A motion image processing method according to claim 48, wherein the motion image data is compressed image data.

51. A motion image processing method according to claim 50, wherein the compressed image data is compressed using the MPEG method.

52. A motion image processing method according to claim 48, wherein said manually instructing step is performed using a user interface displayed on a displaying means.

53. A motion image processing method according to claim 48, wherein said inputting step is performed using a video camera.

54. A motion image processing method according to claim 48, wherein said inputting step is performed using a video capture apparatus and a video camera connected to said motion image processing apparatus by said video capture apparatus.

55. A motion image processing method according to claim 48, wherein said inputting step is performed using a video camera, and said manually instructing step further includes the inputting of commands that can control at least panning, tilt and zoom of the video camera.

56. A motion image processing method according to claim 52, wherein the second motion image is reproduced in response to the instruction to the user interface displayed at a desired time.

57. A motion image processing method according to claim 52, wherein it is possible to perform fast frame search and fast reverse frame search of the second motion image in response to the instruction to the displayed user interface.

58. A motion image processing method comprising the steps of:
inputting motion image data;
variable length coding the motion image data input in said inputting step; and
storing the motion image data coded in said variable length coding step, including storing, as a single file, a predetermined length of time or a predetermined plural number of frames of data coded in said variable length coding step, and the single file has a file name.

59. A motion image processing method according to claim 58, further comprising the step of reading out the motion image data stored in said storing step as the single file.

60. A motion image processing method according to claim 58, wherein said variable length coding step is performed using the MPEG method.

61. A motion image processing method according to claim 58, wherein said variable length coding step is performed using the JPEG method.

62. A motion image processing method according to claim 58, wherein said inputting step is performed using a video camera.

63. A motion image processing method according to claim 58, wherein reading out of an image to be read out is performed by means of the user interface on a display.

64. A motion image processing method according to claim 60, wherein said variable length coding step is performed using the JPEG method, and wherein index information corresponding to the single file exists and includes at least one of (1) information relating to the time when the file is stored, and (2) information relating to the time to store the file.

65. A motion image processing method according to claim 64, wherein the first motion image is input through a network.

66. A motion image processing method according to claim 64, wherein the file name is given to the motion image processing apparatus by a user.

* * * * *

UNITED STATES PATENT AND TRADEMARK OFFICE
CERTIFICATE OF CORRECTION

PATENT NO. : 5,937,096
DATED : August 10, 1999
INVENTOR(S) : TOMOAKI KAWAI

It is certified that error appears in the above-identified patent and that said Letters Patent is hereby corrected as shown below:

COLUMN 1

Line 44, "independent" should read --independently--.

COLUMN 2

Line 21, "device" should read --device in--; and
    Line 65, "as" should read --is--.

COLUMN 4

Line 7,  "made to appear" should read --(made to appear)--; and
             "determin ation" should read --determination--; and
    Line 31, "stared" should read --stored--.

Signed and Sealed this

Thirteenth Day of June, 2000

Attest:

Q. TODD DICKINSON

Attesting Officer       Director of Patents and Trademarks